No. 762,322. PATENTED JUNE 14, 1904.
F. KOHNLE.
MACHINE FOR MAKING AND ATTACHING PIN TICKETS.
APPLICATION FILED OCT. 26, 1903.
NO MODEL. 5 SHEETS—SHEET 2.

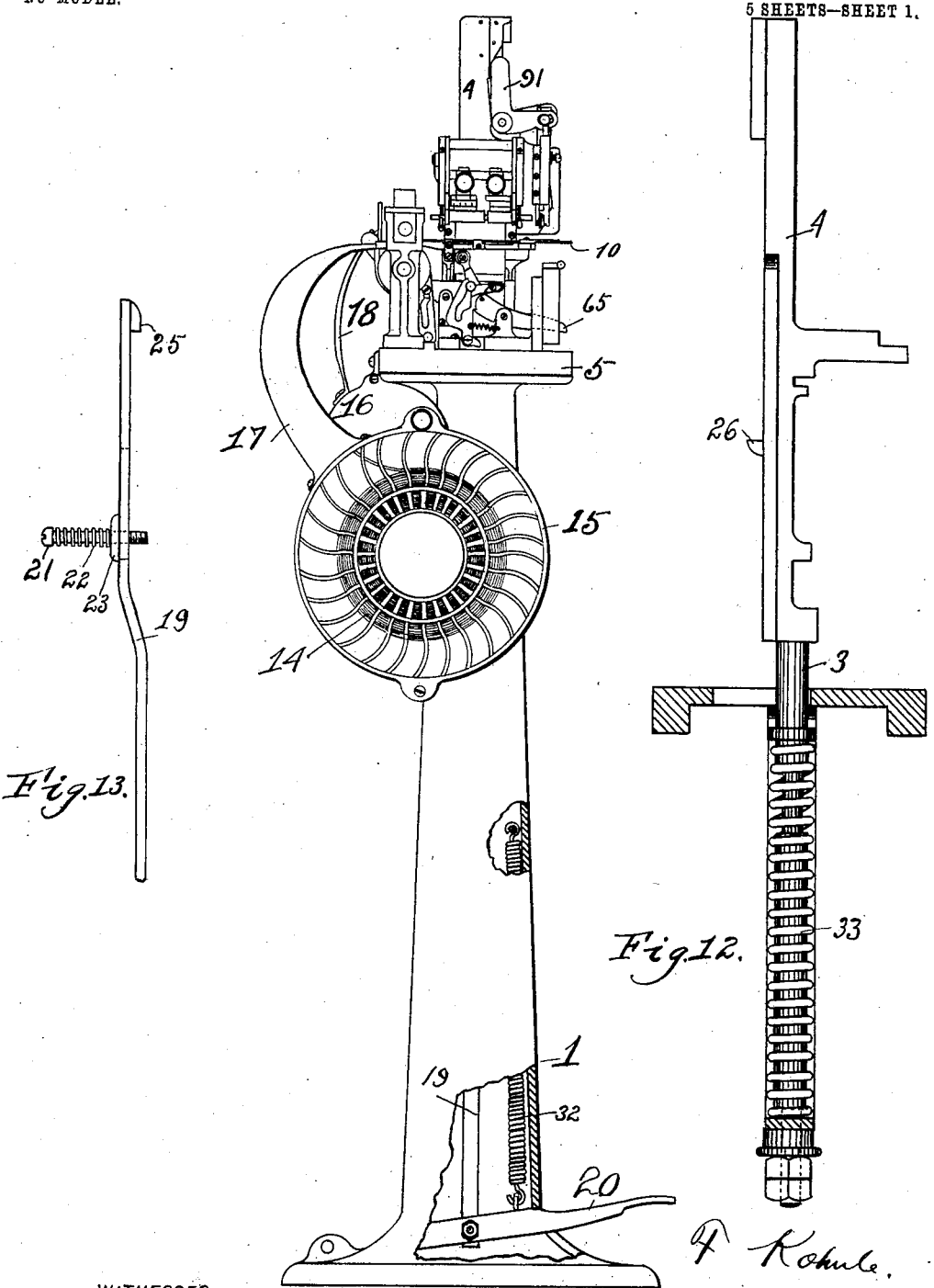

WITNESSES
J. Fred Hemberger
C. M. Theobald

F. Kohnle,
INVENTOR.
By R. J. McCarty,
his ATTORNEY.

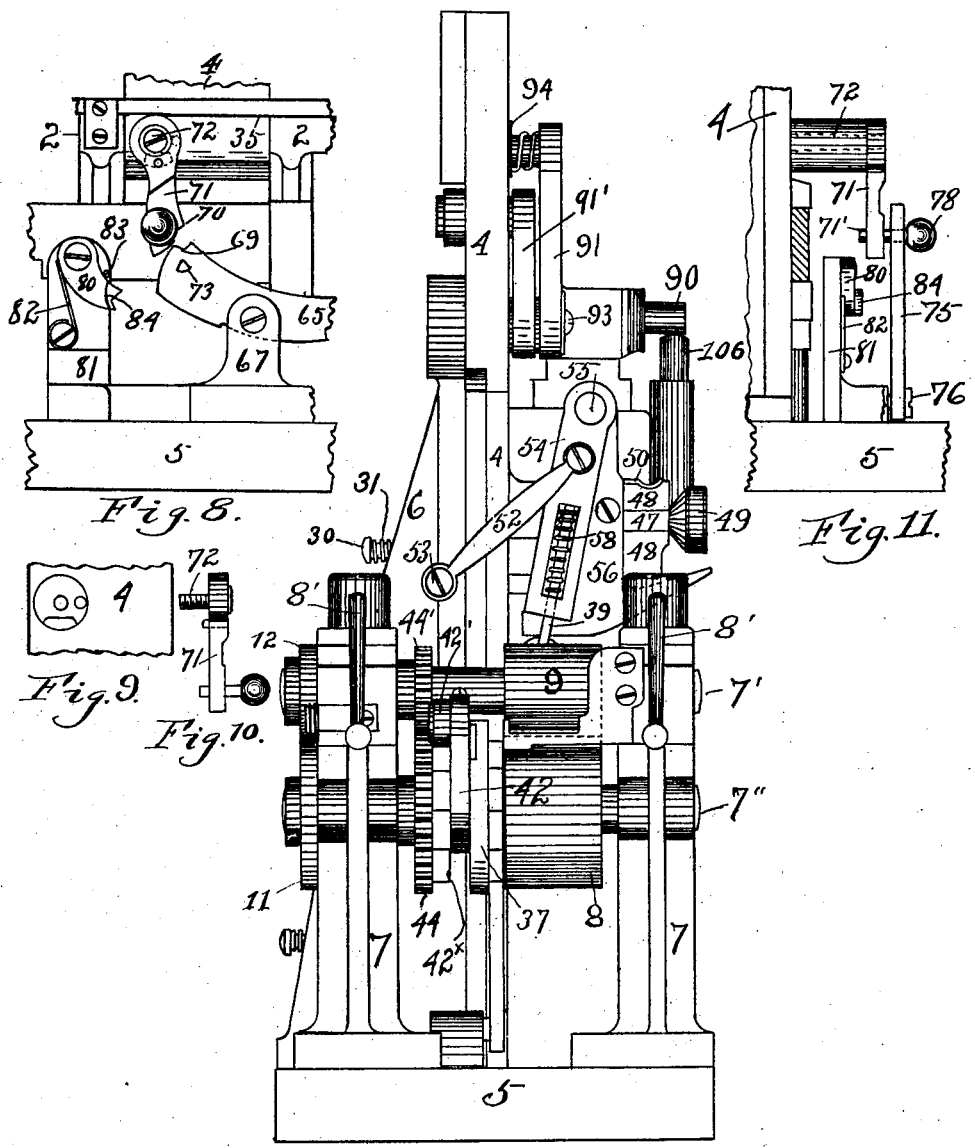

No. 762,322. PATENTED JUNE 14, 1904.
F. KOHNLE.
MACHINE FOR MAKING AND ATTACHING PIN TICKETS.
APPLICATION FILED OCT. 26, 1903.
NO MODEL. 5 SHEETS—SHEET 4.
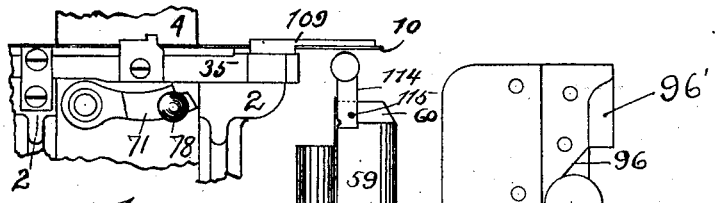
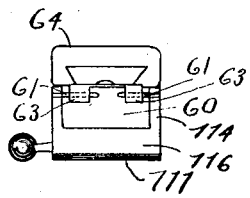
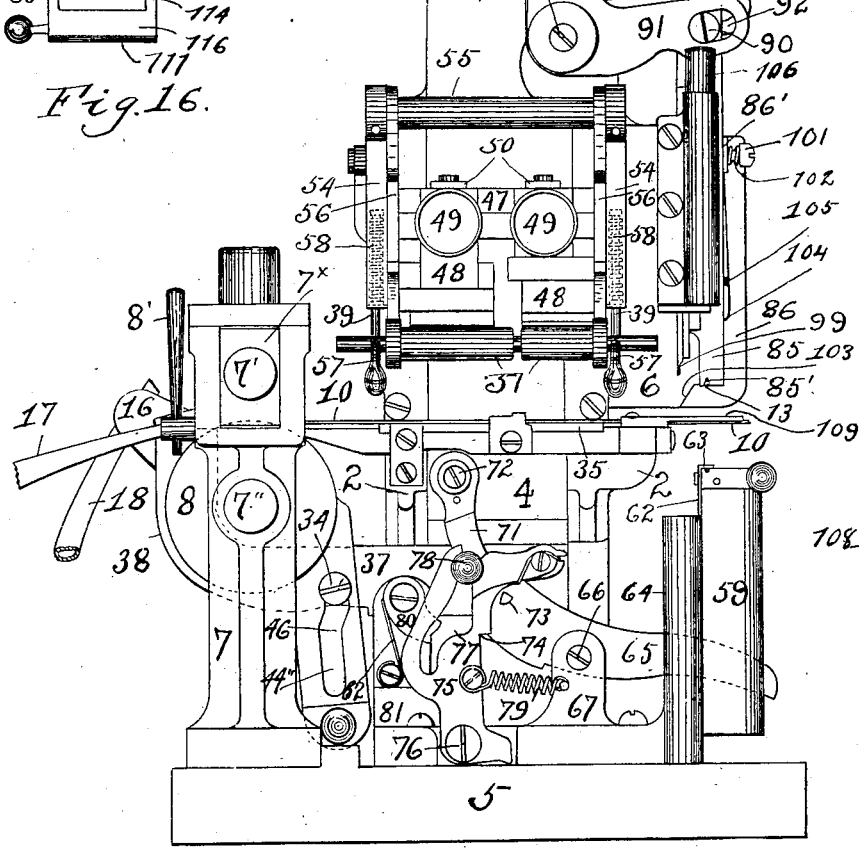
WITNESSES.
J. Fred Hemberger.
C. M. Theobald.
F. Kohnle,
INVENTOR.
By R. J. M'Carty
his ATTORNEY.

No. 762,322. PATENTED JUNE 14, 1904.
F. KOHNLE.
MACHINE FOR MAKING AND ATTACHING PIN TICKETS.
APPLICATION FILED OCT. 26, 1903.
NO MODEL. 5 SHEETS—SHEET 5.

WITNESSES
J. Fred Hemberger
C. M. Thesbach

INVENTOR
F. Kohnle
By R. J. McCarty
his ATTORNEY

No. 762,322.                                                                 Patented June 14, 1904.

UNITED STATES PATENT OFFICE.

FREDERICK KOHNLE, OF DAYTON, OHIO, ASSIGNOR TO THE AUTOMATIC PIN-TICKETING MACHINE CO., OF DAYTON, OHIO.

MACHINE FOR MAKING AND ATTACHING PIN-TICKETS.

SPECIFICATION forming part of Letters Patent No. 762,322, dated June 14, 1904.

Application filed October 26, 1903. Serial No. 178,509. (No model.)

*To all whom it may concern:*

Be it known that I, FREDERICK KOHNLE, a citizen of the United States, residing at Dayton, in the county of Montgomery and State of Ohio, have invented certain new and useful Improvements in Machines for Making and Attaching Pin-Tickets; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in machines for making and attaching pin-tickets to textile fabrics in one operation of the machine—that is to say, the ticket is printed and attached to the pin and staple and to the fabric in each operation.

The objects of the invention are several, principally among which is the provision of a manually-operative machine of the above type which has a greatly-increased capacity for making and attaching pin-tickets to textile fabrics in a most satisfactory manner.

A further object of the invention is to provide a machine of the above type with means for accurately and neatly printing the desired matter upon the tickets; and a still further object of the invention is to provide a machine of the above type upon which the ticket may be made and attached to the fabric in one operation of the machine, as before stated, or the ticket may be made without attaching it to the fabric at the time of the making of the same.

Preceding a detail description of the invention reference is made to the accompanying drawings, of which—

Figure 6:
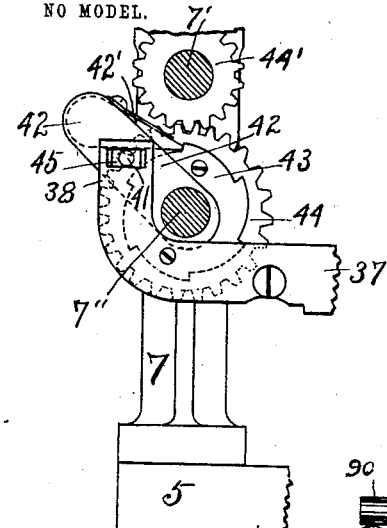
Figure 7:
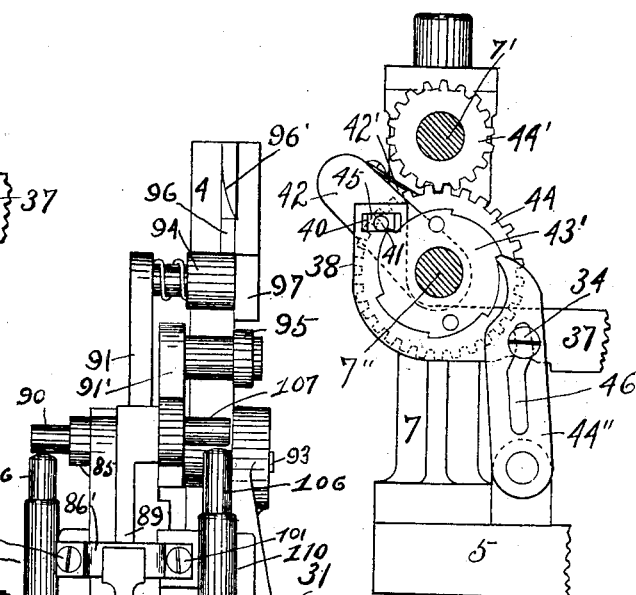
Figure 18:
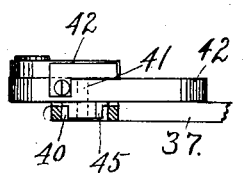
Figure 2:
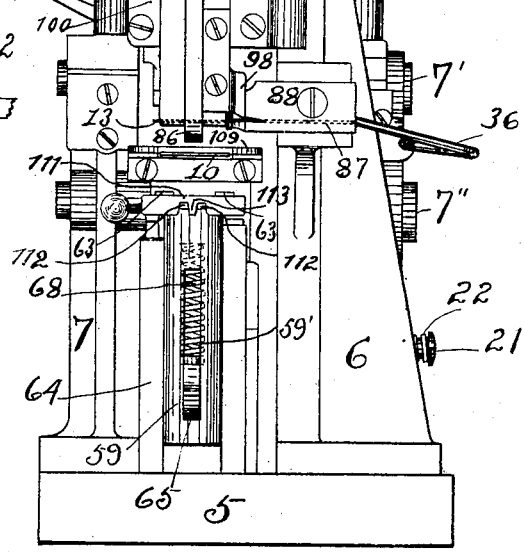
Figure 5:
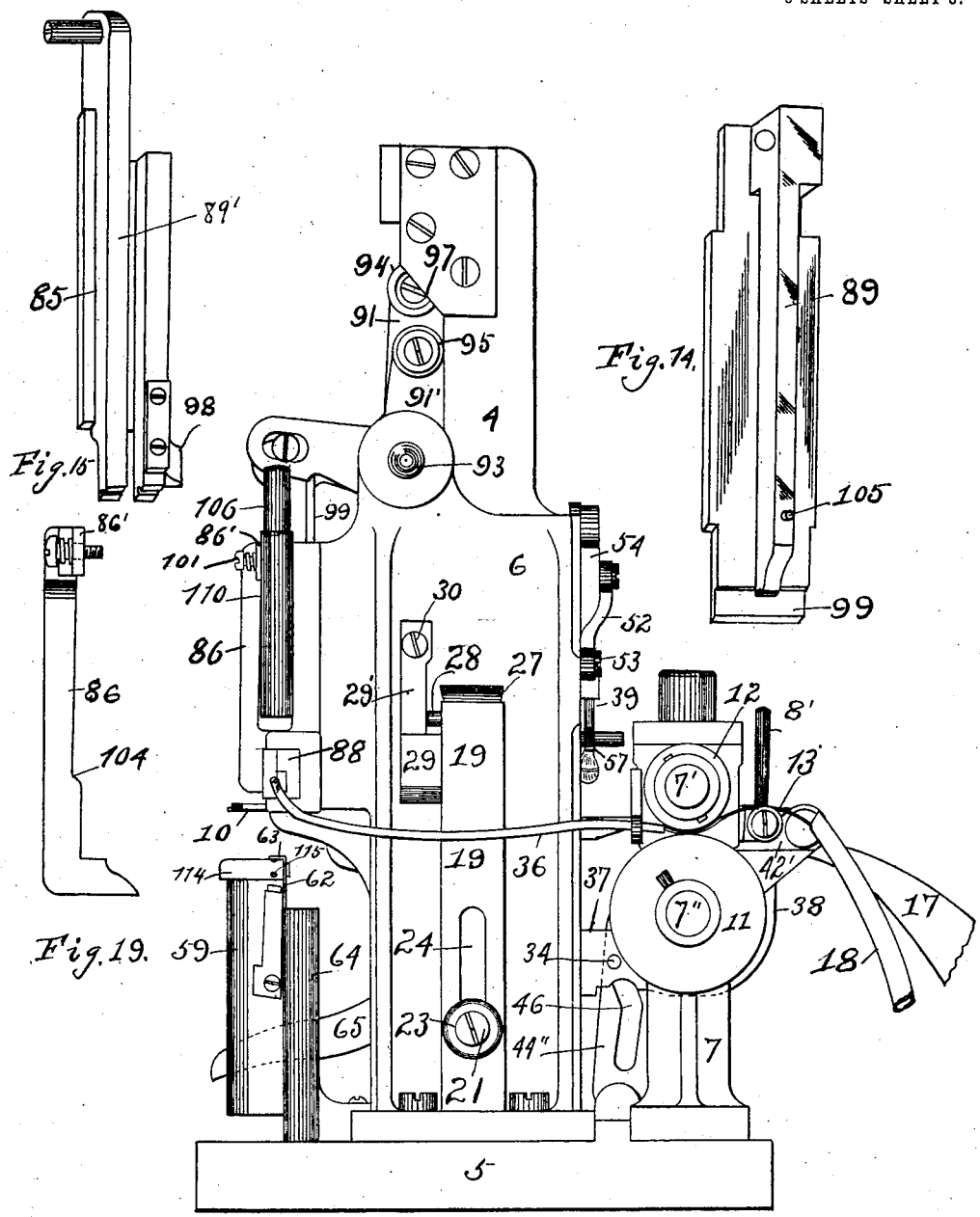

Figure 1 is a vertical sectional elevation of my improved pin-ticket machine. Fig. 2 is a front elevation of the head or upper portion of the machine removed from the pedestal. Fig. 3 is a rear elevation of the same. Figs. 4 and 5 are elevations of opposite sides of the same. Figs. 6 and 7 are details of the wire and paper feeding mechanisms. Figs. 8, 9, 10, 11 are details of the mechanism for elevating the clenching-block or platen. Fig. 12 is a detached view of the main actuating-slide. Fig. 13 is a detail of the slide-actuating rod. Fig. 14 is a detail of the combined paper-cutter slide and staple-driver. Fig. 15 is a detail view of the combined wire bending and cutting slide. Fig. 16 is a top plan view in detail of the clenching-block or platen and its guide; Fig. 17, a detail view of the positions of portions of the clenching-block-actuating mechanism and the supplemental platen when it is desired to make a ticket without uniting it to the fabric. Fig. 18 is a top plan view of a part of the paper and wire feeding mechanism. Fig. 19 is a detail view of the former. Fig. 20 is a top plan view of the paper-guide of the platen.

Throughout a detail description of the invention similar reference characters indicate corresponding parts as illustrated in the drawings.

1 designates a hollow pedestal having a suitable base. Supported upon this pedestal is a head-plate 5, which supports a main frame 6 and journal-standards 7 for the shafts 7' and 7'' of rollers 8 and 9, which feed the paper ribbon 10 from a roll 14, mounted in a casing 15, attached to a side of the pedestal 1. The shafts 7' and 7'' also support the rollers 11 and 12, which feed the wire 13 from a reel in casing 16, which is secured to the head-plate 5. The upper shaft 7' of said feed-rollers has loose journal-bearings $7^\times$, by means of which the upper feed-rollers 8 and 11 may be slightly elevated to permit of the passage of the ends of the paper and wire therebetween in the initial feed of the same. The said journal-bearings $7^\times$ are thus raised by bars 8', which are suitably attached thereto, as shown in Fig. 3. The paper ribbon 10 is conducted through or over a suitable guide 17 to feed-rollers 8 and 9, and the wire 13 is conducted in a similar manner through an initial guide 18 and a tube 36.

In advance of a further description of the paper and wire feeding mechanisms reference will be made to the main actuating-slide 4, (see Fig. 12,) which has a reciprocating motion in the main frame 6, in which is provided a suitable guide therefor. This slide 4 receives its movement from a connecting-rod 19, which extends down and is attached to the pedal 20 at its lower end. The upper end thereof is held in place and guided by a pin 21, which supports a coil-spring 22, that acts against a washer 23 to hold said washer against the upper portion of the connecting-rod, and thus hold said end closely to the frame 6. The pin 21 passes through a slot 24 in said connecting-rod and enters the frame 6, and said pin and slot constitute a guide, as before stated. The upper end of said rod 19 has a hook 25 projecting from its inner face and adapted to engage with a hook or projection 26 on the rear side of the main actuating-slide 4 to lower said slide upon each depression of pedal 20. The engagement of said hooks 25 and 26 is enabled by means of a vertical slot 27 in the main frame 6.

28 is a pin projecting laterally from the upper end of the rod 19 and adapted to engage a cam 29 on the free end of a pendent pawl 29', the latter being held in position by a pin 30 and pressed against the frame 6 by a coil-spring 31, which surrounds said pin. In the downward movement of the connecting-rod 19 the pin 28 moves downwardly in the rear of the cam 29, there being suitable space behind said cam. In the upward movement of said connecting-rod the said pin 28 rides on the outer surface of the cam 29, and thereby is caused to disengage the hook 25 from the hook 26 on the main slide 4 at the limit of the lower movements and to enable said hooks to reëngage at the limit of the upper movements of the slide and connecting-rod. The slide and connecting-rod are elevated through the expansion of springs 32 and 33, the former of which raises the pedal 20 and the latter of which surrounds the extension-rod 3, projecting down from the lower end of the slide 4. The slide and connecting-rod are given over to the influence of these springs when the foot is removed from the pedal 20. The upward movement of said slide feeds the paper across the printing-platen 35, which is stationary, the same being attached rigidly to the side of the main supporting-frame 6 by means of brackets 2, and the feed of the wire through the tube 36 also takes place at the same time.

The paper-feeding mechanism consists in part as follows: Upon the shaft 7'' of the lower feed-rollers there is an arm 37, supported on the main slide 4 and projecting upwardly, as at 38. (See Figs. 6 and 7.) The said upwardly-projecting end has a slot 40, loosely receiving a block 45, secured to a pin 41, the latter being rigidly connected to a link 42. One end of this link is loose on said shaft, and the other end of said link carries a ratchet-pawl 42', that engages a suitable ratchet-wheel 43 on said shaft. Said ratchet-wheel is attached to a spur-wheel 44, that meshes with a spur-wheel 44' on the shaft 7' of the upper feed-rollers. The feed-rollers on said shafts are prevented from overthrowing by means of a check-pawl 44'', pivoted to the head-plate 5 and controlled by the arm 37 through a pin 34, projecting from said arm and entering a cam-slot 46 in the pawl. The pawl 44'' engages a ratchet-wheel 43' on the opposite side of the spur-wheel 44. The ratchet-wheel 43' is similar to wheel 43. The tickets are printed in advance of the stapling operations by the following means.

47 is a bracket supported on the slide 4 and adapted to support a suitable number of type-chases 48, the latter having finger-knobs 49, by which they are removed from and inserted in the bracket or support 47 after a suitable arrangement of the type. When these type chases or holders 48 are in position in the bracket 47, they are firmly held therein by means of plate-springs 50, which press against the upper sides thereof. The faces of the type point downwardly in positions to be inked by the inking-roller 51, which is operated by a connecting-rod 52, one end of which is pivotally connected at 53 to the main frame 6 and the other end of which is similarly connected to an oscillable arm 54. There are two of these arms 54, connected to shaft 55, journaled in side plates 56, attached to the bracket 47. The inking-roller 51 is supported at the lower ends of said arms by means of hooks 57, which have their straight portions 39 projected into said arms and yieldingly maintained therein by coil-springs 58. The lower or hooked ends form supports for the journals of the inking roller or rollers.

59 designates a vertically-reciprocating slide which rigidly supports at its upper end a clenching-block or platen 60, (see Figs. 2 and 16,) against which the pins are pressed, and the ends thereof are clenched against the under side of the fabric. This clenching-block has two alined recesses or cavities 61, which receive the ends of the pins and spread them outwardly and laterally in a position to be clenched when the driver descends. The driver will be presently described.

62 is a plate which is loosely secured, by means of a headed pin, to the rear side of the slide 59 and having laterally-projecting lips 63, which project slightly over the block 60 and cover portions of the recesses 61. These lips prevent the extreme ends of the staples from turning upwardly into the fabric in the clenching operation. The said plate 62 has sufficient looseness to permit of the removal of the fabric and united ticket after the operation of uniting the same, it being borne in mind that the prongs of the pin or staple lie beneath the lips 63 and that the said lips must necessarily rise or yield to permit of the removal of the united fabric and ticket.

The slide 59 has a dovetail connection with an upright guide 64, which is secured to the base-plate 5. (See Fig. 16.)

65 is a lever pivoted at 66 to ears 67, projecting from the base of the guide 64. One end of this lever projects through a vertical slot in said guide and through a similar slot 59' in the slide 59, and by means of this lever the slide 59 and clenching-block 60 are elevated. Within the slide 59 there is a coil-spring 68, which is inclosed between the top of the slide and the end of the lever 65. This spring compensates for any difference in the thickness of textile fabrics placed upon the clenching-block 60. The inner end of the lever 65 has a notch 69, which is engaged by a notch 70 on a hanging pawl 71, said pawl being pivoted on the shaft 72, which is supported in the main actuating-slide 4. This engagement of said pawl with the lever 65 occurs in the descending movement of said slide, and thus the slide 59 is raised to elevate the block 60.

73 is a lug projecting laterally from the lever 65 and designed to engage with a shoulder or notch 74 (see Figs. 4 and 8) on upright pawl 75. The said pawl is pivoted at 76 to a stationary part and has a cam-slot 77, into which a headed pin 78 projects and which moves said pawl to engage the lug 73 with the shoulder 74. The said pin is projected laterally from the pawl 71 and lying normally within the entrance of the slot 77. The upright pawl 75 is pulled in the direction of the lever 65 by a coil-spring 79. The lug 73 is engaged by the notch 74 when the pin 78 has reached the lower limit of the slot 77 and during the impact of the upper clenching mechanism with the clenching-block 60. The lever 65 is held by the said lug 73 and notch 74 in a position which firmly holds the clenching-block 60 in its elevated position. The inner end of the pin 78 projects through on the inner side of the pendent pawl 71, as at 71', (see Fig. 11,) and this feature will be described in connection with the trip-pawl 80, which is pivoted to a stationary standard 81 and is pressed by a spring 82 against a stop-lug 83. The said trip-pawl 80 has a cam end the outer surface 84 of which engages said inner end 71' and causes the pawl 71 to move in a direction away from the lever 65, and the headed pin 78 will actuate the pawl 75 to move the notch 74 thereon away from the lug 73, thus freeing the lever 65 and permitting the slide 59 to move to its lower position under the expanding action of spring 68.

I have now described the operation of and the mechanism for elevating and holding the clenching-block 60 in a position to meet the impact of the staple or pin driver 89, which presses the ends of the staple or pin downwardly into the ticket and fabric. The lower end of the wire-bender 85 is provided with slots 85' in alinement with the wire-slot 87 in the guide-plate 88. The wire-feed tube 36 is projected into the guide 88, and thus the wire is fed into the guide-plate 88 and through the wire-slots 85' in the bender 85 in a position for the latter to form the staple by bending the ends downwardly over the former 86. The said former will be further described. The wire-bender 85 carries on its lower end a wire cutter or blade 98, which performs the function of cutting the necessary length of wire for the formation of each pin or staple. The said wire-bender has a guide-flange projecting longitudinally from a side thereof, which enters a stationary guide 100, secured to the main frame 6. 90 designates a journal projecting from the upper end of said wire-bender and entering an oblong slot 92 in the lower arm of a bell-crank lever 91, which is fulcrumed on a shaft 93, rigidly mounted in the upper portion of the main frame 6. The upper arm of said lever carries a roll-stud 94, having lateral movement on its support, and which is engaged by cam-surfaces 96 and 96' on the upper end of the main slide 4 in the downward movement of said slide. The cam-surface 96 is instrumental in actuating the lever to lower the wire bender and cutter. The surface 96' faces at a right angle to surface 96 and is instrumental in retiring the roll-stud 94 or freeing it from the control of the slide. This it does by pressing the said stud inwardly upon its supporting-pin. When the bell-crank lever 91 is thus released, the wire bender and cutter is permitted to rise out of the path of the wire, and the latter is thus permitted to be fed out of the guide-plate 88. The wire-bender 85 is lowered after each feed of sufficient wire across the former 86 to form the staple and to cut the wire in such operation by the knife 98. The upper end of the former 86 is fixed to a cross-bar 86', the ends of which are loosely penetrated by screws 101, by means of which and coil-springs 102 the former is permitted to be moved outwardly to dislodge the staple from the lower end thereof in a position for the driver 89. The driver moves in a guide-slot 89' in the wire bender and cutter. (See Figs. 14 and 15.) The said wire bender and cutter is first lowered to cut the wire and to bend it, at the completion of which the driver 89 moves down within the slot 89' to drive the staple thus formed through the ticket and the goods. The lower end of the former is tapered, as at 103, to permit of the staple being moved off thereof when said former is moved outwardly, as follows: The inner surface of said former has a cam portion 104, which is engaged by a pin 105 on the driver 89. The driver 89 carries a blade or cutter 99, which severs each ticket from the ribbon by entering the slot 108 in the guide-plate 109, below which the end of the ribbon passes, said guide-plate 109 being secured to an end of the platen and forming a guide for the ribbon 10. The upper end of the driver 89 has a journal 107 projecting therefrom, which enters an oblong slot 92' in the lower arm of the bell-crank lever 91'. This bell-crank lever is fulcrumed upon shaft 93, which also forms the fulcrum for the bell-crank lever 91, hereinbefore referred to. The upper arm of the bell-crank lever 91' carries a roll-stud 95, which is engaged by a cam-surface 97 on the slide 4. Upon the downward movement of said slide the cam-surface 97 thereon engages the roll-stud 95 after the cam-surface 96 engages the roll-stud 94 to operate the bender, to cut the wire, and form the staple. Simultaneously with the completion of the formation of the staple the driver 89 descends by the cam-surface 97 of the slide 4 engaging the roll-stud 95. During this downward movement of said driver the pin 105 thereon engages with the cam-surface 104 on the former 86 and gives said former an initial movement away from the wire-bender 85, and the lower end of the staple-driver 89 engages the tapered end 103 of the former 86 and permits the staple to dislodge. At the completion of the downward movement of the driver 89 the lower or driving end thereof engages the head of the staple and drives it through the ticket into the fabric lying upon the clenching-block or platen 60. The bell-crank levers 91 and 91', the wire-bender 85, and the combined staple-driver and ticket-cutter 99 are elevated to their upper or normal positions by means of socket-bolts 106, which are seated upon springs (not shown) in cylindrical cases 110. The upper ends of these socket-bolts 106 stand immediately below the journals 90 and 107. After the releasing of the mechanism at the completion of the downward movement of the pedal 20 the expansion of springs elevates said bolts.

As hereinbefore stated, the machine is adapted to either make and unite a ticket to a fabric in a single operation resulting from a depression of the pedal 20, or the ticket may be made without uniting or attaching it to the fabric in the operation of making the same. In the latter event the slide 59, supporting the clenching-block 60, is permitted to remain stationary in its lower position by elevating the headed bolt 78 out of the slot 77 in the upright lever 75, as shown in Fig. 17. A supplemental platen is provided in this event consisting of a frame having side arms 114, which are pivoted at 115 to the opposite sides of the clenching-block 60. These arms are connected by an integral cross-bar 116, which is elevated to a position to receive and support the end of the paper ribbon 10 as it is fed over the printing-platen 35 and under the guide-plate 109. The platen-surface 111 on the cross-bar 116 is provided with notches 112, through which the ends of the wire-forming staple pass in the operation of making the ticket. The intervening portion 113 between the notches 112 forms a support for the ticket and the staple in the formation of the latter, the sides of the ticket being also supported on the platen-surface 111. When it is desired to make and attach the ticket to the fabric at one operation, the platen 111 is lowered to the position shown in Figs. 2, 4, and 5.

A brief description of the operation is as follows: The textile fabric to which it is desired to attach the ticket is placed in suitable position upon the platen or clenching-block 60 and is so held by the hands. The pedal 20 is given the necessary downward pressure to carry it to the limit of its movement. The effect of this is to lower the connecting-rod 19 and simultaneously move the inking roller or rollers 51 across the face of the type and to lower the type upon the ribbon 10 to print the lengths of two tickets. Simultaneously with the lowering of the type the clenching-block or platen 60 is elevated through the lever 65, and the wire bender 85 and cutter 98 are lowered to cut the wire and bend the staple around the former 86, and the ticket-cutter 99 is lowered to sever the ticket from the strip 10. The bender 85 remains at the lower limit of its movement until the driver 89 has completed its driving stroke. The said bender and driver are operated independently by the bell-crank levers 91 and 91'. In the return movement of the pedal 20 the paper ribbon 10 is fed across the printing-platen 35, and the extreme end of the ticket, which has previously been printed, is projected over the clenching-block 60 and below the former, cutting, and bending mechanisms.

Having described my invention, I claim—

1. In a pin-ticket machine, the combination with a main actuating-slide and means for operating the same, of paper and wire feeding mechanisms, an arm rigidly attached to and projected from said slide, ratchet mechanism actuated by said arm in the upward movements of the slide to periodically feed the wire and paper, and printing mechanism actuated to print the tickets upon the downward movements of said slide.

2. In a pin-ticket machine, the combination with a main actuating-slide and means for operating the same, of printing mechanism mounted upon said slide and movable into operative position by the downward movement of the slide, bell-crank levers actuated by said slide, a wire bender and cutter actuated by one of said bell-crank levers, a former having outward movement, and a ticket-cutter adapted to sever each ticket, said ticket-cutter in its downward movement imparting to the former the outward movement to clear the pin, a driver to which said ticket-cutter is attached said driver being adapted to clench the pin through the ticket and the fabric, said driver being actuated by the other of said bell-crank levers.

3. In a pin-ticket machine, the combination with a main actuating-slide and means for imparting reciprocating movements thereto, and cams on said slide, of ticket-printing mechanism actuated by said slide, pin-forming devices, a ticket-cutting knife, and bell-crank levers adapted to actuate said pin-forming devices and ticket-cutter, said bell-crank levers being actuated by the cams on said main actuating-slide.

4. In a pin-ticket machine, the combination with a main actuating-slide and means for operating the same, of a platen-slide, a lever to elevate said platen-slide, a pawl pivoted on the main actuating-slide, means interposed between said pawl and said lever for actuating the latter, a slotted pawl actuated by the pawl upon the main actuating-slide to lock and release the platen-slide lever, and a trip-pawl controlling the pawl upon the main actuating-slide to release the slotted pawl from engagement with the lever of the platen-slide and thereby permit the platen-slide to be lowered.

5. In a pin-ticket machine, the combination with a main actuating-slide and means for operating the same, of a platen-slide, and a pin-clenching platen pivotally connected to said platen-slide and adapted to be moved to a position to permit of the making of a pin-ticket without attaching it to a fabric.

6. In a pin-ticket machine, the combination with a main actuating-slide, a connecting-rod adapted to engage said slide to lower the same, means independent of said connecting-rod to elevate the slide upon the limit of the downward movement imparted thereto by said connecting-rod, an arm projecting from said main actuating-slide, paper and wire feeding devices actuated by said arm upon each upward movement of said main actuating-slide, ticket-making devices actuated by said slide in the downward movement thereof, a platen-slide, and means interposed between said platen-slide and the main actuating-slide, whereby the former is elevated upon each downward movement of the main actuating-slide to meet the impact of the ticket-making devices.

7. In a pin-ticket machine, the combination with a main actuating-slide, of a platen-slide, mechanism interposed between said platen-slide and said main actuating-slide, by which said platen-slide is elevated upon the downward movement of said main actuating-slide, pin-ticket forming and cutting mechanisms, and means interposed between said mechanisms and said main actuating-slide whereby the said pin-ticket forming and cutting mechanisms are lowered by the main actuating-slide in the downward movements thereof.

8. In a pin-ticket machine, the combination with a movable platen-slide having cavities in the upper face thereof to receive the ends of the pin to deflect said ends laterally in the operation of clenching the pin, and a plate loosely connected to the platen-slide, said loosely-connected plate having lips projecting over the cavities in the face of the platen-slide and serving to prevent the ends of the pins from turning up in the operation of clenching the pin to the goods.

9. In a pin-ticket machine, the combination with a main actuating-slide having cams thereon, of a staple-former, a wire bender and cutter, a bell-crank lever connected to said wire bender and cutter, said bell-crank lever being actuated in each downward movement of the main actuating-slide by one of the cams thereon, to lower said wire bender and cutter to form a pin, and the other of said cams having means to actuate said bell-crank lever to permit the wire bender and cutter to retire so as to permit the wire to be fed across said staple-former upon the upward stroke of the main actuating-slide.

10. In a machine for making and uniting pin-tickets, a platen-slide, a lever to elevate said platen-slide, a slotted pawl coöperating with said lever to hold said slide in an elevated position, a pawl on the main actuating-slide adapted to actuate said lever to elevate the platen-slide, and to permit of the slotted pawl engaging said lever to maintain the platen-slide in its elevated position, and a trip-pawl adapted to engage the pawl on the main actuating-slide to release the engagement between said lever and said slotted pawl and thereby permit the platen-slide to return to its lower position.

11. In a machine for making pin-tickets, the combination with a main actuating-slide, of feeding mechanisms actuated by said main slide upon the upward movements thereof, a connecting-rod engaging said main slide to lower it, and means for disconnecting said connecting-rod with the slide at the lower limit of their movement and whereby the said slide is free from any connection with said rod during its upward movement, substantially as set forth.

In testimony whereof I affix my signature in presence of two witnesses.

FREDERICK KOHNLE.

Witnesses:
   R. J. McCarty,
   C. M. Theobald.